United States Patent [19]
Punkert

[11] Patent Number: 5,226,960
[45] Date of Patent: Jul. 13, 1993

[54] ASPHALT PAVING MIX AND METHOD FOR MAKING IT

[75] Inventor: Frederick P. Punkert, Denver, Colo.

[73] Assignee: Inphalt, Inc., Grande Prairie, Tex.

[21] Appl. No.: 880,081

[22] Filed: May 6, 1992

[51] Int. Cl.$^5$ ............................................. C08L 95/00
[52] U.S. Cl. ................................................... 106/282
[58] Field of Search ............................................. 106/282

[56] References Cited

U.S. PATENT DOCUMENTS

| | | |
|---|---|---|
| 1,211,382 | 1/1917 | Altpeter ............................. 106/282 |
| 2,268,759 | 1/1942 | Martin ................................. 106/282 |
| 2,354,593 | 7/1944 | Greider et al. ...................... 106/282 |
| 3,216,888 | 11/1965 | Cacossa et al. . |
| 3,470,006 | 9/1969 | Brunel . |
| 3,615,804 | 10/1971 | Defregger et al. . |
| 3,819,291 | 6/1974 | McConnaughay . |
| 3,870,426 | 3/1975 | Kietzman et al. . |
| 3,977,891 | 8/1976 | Bertrand . |
| 4,168,179 | 9/1979 | Hesseler . |
| 4,227,933 | 10/1980 | McAllister, Jr. . |
| 4,548,650 | 10/1985 | Kietzman . |
| 4,613,376 | 9/1986 | Nilsson et al. . |
| 4,895,754 | 1/1990 | Graham et al. . |

*Primary Examiner*—David Brunsman
*Attorney, Agent, or Firm*—Klaas, Law, O'Meara & Malkin

[57] ABSTRACT

An asphalt paving mix preferably comprising a mixture of asphalt oil preferably in the range of between about 18 and 22 percent by weight; mineral wool fiber preferably in the range of 17 and 23 percent by weight and having a length of between about 0.5 and 5.0 inches and a shot content of between about 25 and 35 percent by weight and aggregate material preferably in the range of between about 55 and 65 percent by weight and having a particle size not less than 0.060 inch and methods for making the asphalt paving mix.

11 Claims, No Drawings

ASPHALT PAVING MIX AND METHOD FOR MAKING IT

FIELD OF THE INVENTION

This invention relates generally to asphalt paving mixes useful for roads and highways and more particularly to an asphalt paving mix incorporating asphalt oil, mineral fibers and aggregate material.

BACKGROUND OF THE INVENTION

Deterioration of asphalt surfaces and concrete surfaces over its inception and use for the last hundred years has been a major problem for road builders and governments. The cost of maintenance is usually higher than the original cost of application. Sealers, surface coatings, cement base, emulsifiers to the oil, layering and many other methods have not remedied the structural damage to the asphalt body. This cracking and deterioration is common worldwide. In warm climates, side slipping or lateral motion results in the rutting of the road surfaces. In northern climates, cracking and heaving of the surfaces, due to expansion and contraction, i.e. freeze-thaw cycles, sometimes limits road surface life to 3 years or less. Therefore, there exists a need for an asphalt paving mix that remedies the above-identified problem areas.

BRIEF DESCRIPTION OF THE INVENTION

This invention provides an asphalt paving mix comprising a mixture of asphalt oil, mineral fibrous material and aggregate material wherein the mineral fibrous material acts as a reinforcing material and provides greater flexibility and durability to the product and cooperates with the aggregate material to provide improved drainage characteristics.

In a preferred embodiment of the invention, the asphalt paving mix comprises a mixture having an asphalt oil in the amount of between about 18 and 22 percent by weight; a mineral fibrous material in the amount of between about 17 and 23 percent by weight and an aggregate material in the amount of between about 55 and 65 percent by weight. The mineral fibrous material preferably comprises mineral wool fibers formed from slag and having a length of between about 0.50 and 5.0 inches and a diameter between about 1 and 20 microns. The aggregate material preferably has a particle size not less than 0.60 inch. In a more preferred embodiment of the invention, the asphalt oil is present in the amount of about 20 percent by weight, the mineral wool fibers are present in the amount of about 20 percent by weight and the aggregate material is present in the amount of about 60 percent by weight.

DETAILED DESCRIPTION OF THE INVENTION

The asphalt paving mix of this invention comprises, in the preferred embodiments thereof, an intimate mixture having an asphalt oil in the amount of between about 18 and 22 percent by weight; a mineral fibrous material in the amount of between about 17 and 23 percent by weight and an aggregate material in the amount of between about 55 and 65 percent by weight.

The asphalt oil is selected from any of the asphalt oils conventionally used in asphalt paving mixes.

The mineral fibrous material comprises mineral fibers formed from slag, basalt, or other materials having similar characteristics. The mineral fibrous material has a resistance to structural failure from water and a compatibility to the asphalt oils. In the preferred embodiments of the invention, the mineral fibrous material comprises mineral wool fibers formed from a slag. The mineral wool fibers are made by a process wherein the slag is melted to a temperature of between about 2825 degrees F. and 2875 degrees F. and preferably of about 2850 degrees F. and dropped into a centrifugal spinner to produce fibers having a length of between about 3.0 to 5.0 inches and when processed having a length of between about 0.5 to 5.0 inches and an average length of about 2.0 inches. The mineral wool fibers have diameters of between about 1 and 20 microns.

The commercial mineral wool fibers normally have a shot content of between about 20 and 45 percent by weight and preferably have a shot content between about 25 and 35 percent by weight with the most preferred mineral wool fibers having a shot content of about 30 percent by weight. The shot content of the mineral wool fibers functions as a filler material. However, in the lower range of the shot content, it may be desirable to add a small percentage of filler material, such as sand. Surface coatings are preferably not used on the mineral wool fibers, but it is to be understood that, when used with certain asphalt oils, it may be desirable to coat the mineral wool fibers with wetting agents and/or annealing oils and coupling agents.

The aggregate material comprises an aggregate material of the type used in conventional asphalt paving mixes. However, the aggregate material used in the asphalt paving mixes of this invention has a preferred minimum particle size of not less than 0.060 inch. In asphalt paving mixes applied at a thickness of about 1.0 inch, the upper limit of the particle size of the aggregate material would be about 0.50 inch. In asphalt paving mixes applied at a thickness of about 2.0 inches, the upper limit of the particle size of the aggregate material would be about 0.75 inch. The aggregate material in this invention functions to provide compressive strength in the asphalt paving and reduces overall cost of the mix.

The asphalt paving mixes of this invention are preferably formed by a process in which the mineral wool fibers are fed into a debaler. In normal practice, the mineral wool fibers are compacted into bales in the ratio of about 4:1 for shipping purposes. The debaled mineral wool fibers and the aggregate material are fed continuously into a blending hopper to be intermingled. After being blended together, they are fed into a conventional kiln to be further mixed together and raised to a temperature of between about 325 degrees F. to 725 degrees F. and preferably to a temperature of about 475 degrees F. to remove water and to preheat the mixture to achieve maximum asphalt oil flow and coverage. The blended mineral wool fibers and the aggregate continue to move through the kiln and the temperature thereof is reduced to about 350 degrees F. The mixture is then sprayed with asphalt oil at a temperature of about 350 degrees F. using a plurality of nozzles. The mineral wool fibers, the aggregate material and the asphalt oil are supplied in desired amounts to obtain the asphalt paving mixes described above.

In one embodiment of the invention, a cubic yard of a conventional asphalt paving mix having an asphalt oil content of about 4.0 percent by weight was heated to a temperature of about 425 degrees F. and fed into an auger. A cubic yard of baled mineral fibers, made from slag, was debaled and fed into the auger and mixed. An additional amount of asphalt oil in an amount of about 16 percent by weight of the asphalt paving mix was added to the auger. After being thoroughly mixed, the resulting composition was an asphalt paving mix comprising about 20 percent by weight of the asphalt oil, about 20 percent by weight of the mineral fibers and about 60 percent by weight of the aggregate material and having a volume of about 2.0 cubic yards.

Test samples of an asphalt paving mix made in accordance with this invention and test samples made in accordance with a conventional asphalt mix were formed. Each test sample had a length of about 12.0 inches, a width of about 12.0 inches and a thickness of about 1.0 inch. Each test sample was placed over a circular rod having a diameter of about 6.0 inches so that the centerline of the sample was in contact with the uppermost portion of the circular rod. The sample was then bent to conform to the radius of the rod. The samples formed from the conventional asphalt paving mixes cracked into two parts after being deflected through an angle of about 10 degrees. The samples formed from the asphalt paving mix of this invention exhibited multi-surface cracks when deflected through an angle of about 30 degrees; however, the sample did not fail catastrophically as in the case of the conventional asphalt. The surface cracks were not visible when the sample was returned to its original condition. At no instance did a continuous surface crack extending from end to end appear in the test samples formed from the asphalt paving mixes of this invention.

Another method for forming the asphalt paving mix uses a conventional mineral wool fiber forming process. In a rock wool or mineral wool fiber manufacturing plant, the mineral fibers are formed, as described above, and are moved into the blowing chamber. Asphalt oil in the amount of between about 8 and 12 percent by weight, and preferably in the amount of about 10 percent by weight and at a temperature of between about 325 and 400 degrees F. and preferably about 350 degrees F., is sprayed onto the mineral fibers. The asphalt oil coated mineral fibers are then compacted at a ratio of about 4 to 1 and cooled and cut into particle-sized chunks preferably as cubes of between about 2 and 4 inches and preferably about 3 inch cubes. Each cube contains mineral wool fibers in the amount of between about 88 and 92 percent by weight and preferably about 90 percent by weight and asphalt oil in the amount between 8 and 12 percent by weight and preferably about 10 percent by weight. The cubes are then shipped to an asphalt manufacturing plant and stored until needed. The asphalt paving mix is then formed by heating the cubes of asphalt oil coated mineral fibers to a temperature of between about 325 and 400 degrees F. and preferably about 350 degrees F. and blended with additional asphalt oil in the amount of between about 7 and 18 percent by weight and preferably in the amount of about 10 percent by weight and with aggregate filler material in the amount of between 50 and 70 percent and preferably in the amount of about 60 percent by weight in a rotating drum system or kiln at a temperature of between about 325 and 400 degrees F. and preferably of about 350 degrees F. to form an asphalt paving mix comprising a mixture having between about 15 and 30 percent by weight of the asphalt oil and preferably of about 20 percent by weight; between about 10 and 30 percent by weight of the mineral fibrous material and preferably about 20 percent by weight thereof and between about 50 and 70 percent by weight of aggregate and preferably about 60 percent by weight.

The mineral wool fibers are dispersed through the formed asphalt paving in an interlocking relationship to provide reinforcement in all directions and function with the aggregate material to provide voids for drainage purposes. The asphalt paving mixes in the preferred embodiments of this invention may be used in the formation of a new road or may be used as an overlay to repair an existing road whether it be an asphalt road or a concrete road.

While the asphalt paving mixes have been described in relation to the preferred embodiment of the invention, it is to be understood that advantageous results may be obtained wherein the asphalt paving comprises an asphalt oil in the amount of between about 15 and 30 percent by weight; a mineral fibrous material in the amount of between about 10 and 30 percent by weight and an aggregate and filler material in the amount of between about 50 and 70 percent by weight. In the percentage ranges outside of the preferred ranges described above, the asphalt paving mixes in the wider ranges are suitable for parking lots, driveways, outdoor courts, bases for ice rinks and other similar uses.

The asphalt paving mixes of this invention can be applied using conventional spreaders and packers. The asphalt paving mixes of this invention are generally applied as a hot mix but can be applied by a cold mix wherein diesel oils are added to the hot asphalt paving mix prior to storage. When a conventional asphalt paving mix is compacted, the resulting structure has a substantially uniform density throughout its thickness. In test samples using asphalt paving mixes of this invention, an original thickness of about 2.50 inches is compacted into an end product having a thickness of about 2.0 inches and the density diminishes from the upper surface toward the lower surface resulting in a smooth surface with a porous flexible mass underneath. The inclusion of the mineral wool fiber results in a doubling of the volume of the asphalt and aggregate material giving twice the coverage at about two-thirds of the weight per yard.

It is contemplated that the inventive concepts herein described may be variously otherwise embodied and it is intended that the appended claims be construed to include the alternative embodiments of the invention except insofar as limited by the prior art.

What is claimed is:

1. An asphalt paving mix comprising:
   a mixture having between about 15 and 30 percent by weight of an asphalt oil; between about 10 and 30 percent by weight of a mineral fibrous material and between about 50 and 70 percent by weight of an aggregate filler material; and
   said mineral fibers having a length of between about 0.5 to 5.0 inches.

2. The invention as in claim 1 wherein said mineral fibrous material comprises:
   mineral wool fibers formed from slag.

3. An asphalt paving mix for forming roads and highways comprising:
   a mixture having between about 18 and 22 percent by weight of an asphalt oil; between about 17 and 23 percent of a mineral fibrous material and between about 55 and 65 percent by weight of an aggregate material; and
   said mineral fibers having a length of between about 0.5 to 5.0 inches.

4. The invention as in claim 3 wherein said mineral fibrous material comprises:
   mineral wool fibers formed from slag.
5. The invention as in claim 4 wherein:
   said aggregate material has a particle size not less than 0.060 inch.
6. The invention as in claim 4 wherein:
   said mineral fibrous material has a shot content of between about 25 to 45 percent by weight.
7. The invention as in claim 4 wherein:
   said mineral fibrous material has a shot content of between about 27 to 35 percent by weight.
8. The invention as in claim 3 wherein:
   said asphalt oil is present in the amount of about 20 percent by weight; said mineral fibrous material is present in the amount of about 20 percent by weight and said aggregate material is present in the amount of about 60 percent by weight.
9. The invention as in claim 10 wherein:
   said mineral fibrous material is formed from slag.
10. The invention as in claim 8 wherein.
    said aggregate material has a particle size not less than 0.060 inch.
11. The invention as in claim 10 wherein:
    said mineral fibers have a shot content of about 30 percent by weight.

* * * * *